(12) United States Patent
Whitten

(10) Patent No.: US 12,481,579 B1
(45) Date of Patent: Nov. 25, 2025

(54) LIGHTWEIGHT GPU MEMORY ALLOCATOR

(71) Applicant: Proximation NV, LLC, Las Vegas, NV (US)

(72) Inventor: Gregory F. Whitten, Las Vegas, NV (US)

(73) Assignee: Proximation NV, LLC, Las Vegas, NV (US)

( * ) Notice: Subject to any disclaimer, the term of this patent is extended or adjusted under 35 U.S.C. 154(b) by 0 days.

(21) Appl. No.: 18/976,182

(22) Filed: Dec. 10, 2024

(51) Int. Cl.
*G06F 12/00* (2006.01)
*G06F 12/02* (2006.01)

(52) U.S. Cl.
CPC .................. *G06F 12/023* (2013.01)

(58) Field of Classification Search
CPC ........ G06F 12/023; G06F 12/02; G06F 12/06; G06F 12/08
See application file for complete search history.

(56) References Cited

U.S. PATENT DOCUMENTS

2011/0055511 A1\* 3/2011 Mantor ................ G06F 9/5016
711/170

\* cited by examiner

*Primary Examiner* — Shawn X Gu
(74) *Attorney, Agent, or Firm* — Russell S. Krajec; Krajec Patent Offices, LLC

(57) ABSTRACT

A computer system with GPUs or other special-purpose or general-purpose processors may allocate processor-specific memory in variable-sized blocks based on 2^n sizing. Once a block has been allocated to a processor's process, that process may access the block directly without additional lookups or other overhead, by using a memory address composed of a block's allocated prefix stored in a set of registers, along with the sequential address in memory. A memory allocator may receive a request for memory of a given size, identify a contiguous block within physical memory, and populate a set of registers with the memory prefix. The processor may store and retrieve data using the memory prefix and the sequential address suffix. When addresses may be managed and stored in a secure operating system-level allocator, memory may be secured against cross-processor access.

18 Claims, 4 Drawing Sheets

LIGHTWEIGHT GPU MEMORY ALLOCATOR

BACKGROUND

Modern computing has several well developed techniques for memory management when multiple processes compete for resources. For Graphics Processing Units (GPUs), the predominant techniques for memory management include CUDA Unified Memory (where Central Processing Units (CPUs) and GPUs share memory space), Heterogeneous Memory Management (HMM) (where GPUs can access all system-allocated memory), and Data/Model Parallelism (where a dataset or model is divided into small batches that are processed independently).

Graphics Processing Units are specialized processors that are designed for highly parallel applications. Most GPUs have numerous small, specialized cores (when compared to CPUs), and are used for tasks associated with large datasets and parallel computation. Such computations include graphics processing, hence the name, but also have included artificial intelligence applications, cryptocurrency mining, and other high performance computing workloads.

SUMMARY

A computer system with GPUs or other special-purpose or general-purpose processors may allocate processor-specific memory in variable-sized blocks based on $2^n$ sizing. Once a block has been allocated to a processor's process, that process may access the block directly without additional lookups or other overhead, by using a memory address composed of a block's allocated prefix stored in a set of registers, along with the sequential address in memory. A memory allocator may receive a request for memory of a given size, identify a contiguous block within physical memory, and populate a set of registers with the memory prefix. The processor may store and retrieve data using the memory prefix and the sequential address suffix. When addresses may be managed and stored in a secure operating system-level allocator, memory may be secured against cross-processor access.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

GPU Memory Allocator

Figure 1:
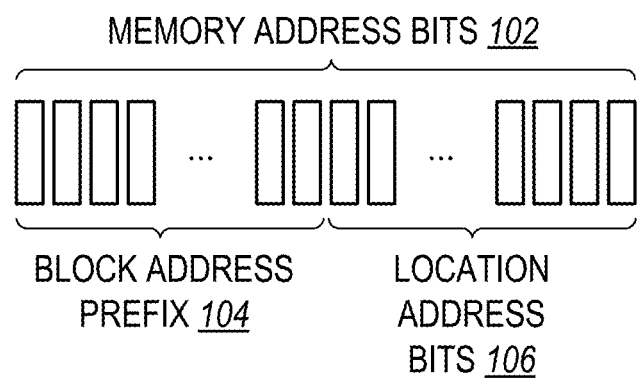
FIG. 1 is a diagram illustration of a memory allocation and addressing mechanism for low-latency memory access, such as may be useful with Graphical Processing Units.

A computer system with Graphics Processing Units (GPUs) may allocate memory to the GPUs by using a power of 2 addressing scheme and block size. A request for memory may be made to a memory allocator, and the request may include a desired block size. The memory allocator may find a contiguous block of GPU-accessible memory of the requested size, and it may set a group of registers with that block's beginning address as a prefix. The GPU may then access the memory using the prefix and a sequential memory location.

Throughout this specification, the term "Graphics Processing Units" or GPUs may be used as merely an example of how memory may be allocated and managed between processors. The memory allocator, memory access, and other functions described herein may also be used with systems that have multiple general purpose Central Processing Units (CPUs) as well as other systems that may be specialized processors. The use of GPUs as an example throughout this specification is not meant to be limited only to Graphics Processing Units, but is merely an example of a use case of these techniques and technologies to improve the operation of systems on which multiple processes may operate.

The various processors may be considered "assignable processors" in the sense that an operating system or management process may assign certain executable code or processes to execute on the assignable processors. The memory that may be allocated to the assignable processors may be considered "memory accessible to the assignable processors." In some cases, a management process, such as an operating system, may operate on a system to manage the processes by assigning processors to execute the processes and allocate memory to those processors.

The memory allocator and technique for addressing memory may be the fastest, most lightweight way to allocate GPU memory to GPU processes. Alternative memory management techniques, for example virtual memory mapping techniques, require a lookup function for every memory access. Such lookup functions, along with the memory management overhead such as page fault detection, memory swapping, etc., add overhead to every memory access and thereby slow down processes running on a GPU.

Direct memory access using the memory allocation avoids the lookup functions of conventional memory management. The fact that memory is addressed directly without lookups and other memory management overhead makes the memory allocator much faster for GPU-specific processes, which tend to be high-compute workloads.

The security of the memory allocator and technique for addressing memory may be very high, in the sense that one process may be unable to access memory associated with other processes.

The memory allocator may, in some cases, use a set of hardware registers to store a memory location's prefix, and such registers may be under the control and security of an operating system, rather than the processes executing on top of the operating system. The hardware registers may be part of the GPU memory access functionality, such that each memory access may happen at least partially in hardware. When dedicated hardware registers are used with a memory allocator, additional processing speed may be realized, but also the security may be improved by making it more difficult for processes from accessing memory locations to which access has not been granted.

In some cases, the memory allocator and prefix registers may be a completely software solution, yet because the memory allocator and prefix registers are under the control of the operating system, a GPU process may still not be able to access another GPU process's assigned memory location.

Sequential and contiguous memory blocks are assigned by the memory allocator to processes that request memory. Because the memory block may be sequential and contiguous, the process running on the GPU may access memory directly without having a virtual memory address lookup or other overhead. In many cases, such sequential and contiguous memory blocks may be physically contiguous and sequentially addressable.

Memory Addressor

A memory addressor may allow processes running on a GPU to access blocks of memory allocated to that process. The memory addressor may receive the address from a process, then prepend all memory addresses with the block's address associated with the process running on the GPU.

Because the memory addresses are accessed using blocks that are sized using a power of 2 system, the memory addresses are a sequence of 1's and 0's, where there is a fixed length of binary digits. The memory address from a process may be passed to the memory addressor for that process, and the memory addressor may prepend or overwrite the block address at the beginning of the memory address.

Because the block address may be overwritten on the memory address with each memory call, any process may be prohibited from accessing memory contents of any other process. This feature of the memory addressing mechanism is inherently safe. Even if a process were attempting to access memory outside of its allocated block, the memory addressor would overwrite any digits outside of the allocated space, thereby prohibiting unauthorized access.

The memory addressor may be implemented in a manner that is inherently fast. Some GPU chipsets may have hardware registers that may be set for a process's memory block. In such a design, every memory access may be overwritten or prepended by the hardware registers during a read or write. Other implementations may be performed in software or a combination of software and hardware.

Graphics Processing Units may be designed for speed of processing. Many GPU workloads are compute-heavy, and as such, may GPU systems have hundreds or even thousands of cores. By reducing overhead, such as memory allocation and addressing, the overall performance of GPU systems may be dramatically enhanced.

Many processes may have memory allocated that may be dedicated to that process. Such memory may be inherently secure, as no other processes may be able to access that memory. However, some processes or groups of processes may also be allocated shared memory. Shared memory may be a block of memory that may be accessed by two or more processes and accessed using the same memory allocation and access methods used for dedicated memory accessible from a specific process. Some instances may allocate a block of dedicated memory for each process and a block of shared memory for those processes.

Memory Management

The overall memory management system may include additional features, such as defragmentation/consolidation of memory blocks.

A potential tradeoff between the lightweight memory addressing mechanism for GPUs and more elaborate, but computationally costly systems such as virtual memory mapping, may be that memory blocks may be allocated and released over time. This may result in smaller blocks of memory being scattered throughout the addressable memory space with few or no larger contiguous blocks being available.

A memory management function may defragment or consolidate GPU memory. In some cases, a defragmentation or consolidation process may be triggered when a block may be requested by a process and a single block of that size may not be available. In other cases, a defragmentation or consolidation process may be triggered periodically as part of maintaining a general resource hygiene.

A defragmentation or consolidation process may operate by identifying a process with a block of memory that may be moved. The process may be paused, the memory copied from one block of memory to another block of the same size, and the prepended block addressed may be updated. Once those steps have been completed, the process may resume.

Many memory management systems may keep a map of available memory which may include which blocks have been allocated to which processes. The map may indicate which blocks may be allocated to specific processes and which blocks may be available for allocation.

Memory blocks may be allocated and deallocated as processes may be instantiated and terminated. Some systems may provide a signal or flag to return memory to the pool of available blocks when a process may be terminated. Other systems may periodically check whether a process may still be operational and may free up memory when the process may no longer exist.

The memory map may be consulted when a new process may request a memory allocation. The request may include a requested size of the block, and based on the size, a suitable-sized block may be identified from the available blocks. If no blocks are identified that are meet the block size request, but there are sufficient, but non-contiguous unallocated blocks that would meet the block size request, a defragmentation process may be launched. The defragmentation process may consolidate the allocated blocks together and thereby consolidate the unallocated blocks. The request for a new block size may then be honored.

One or more processes may be paused during the defragmentation, which may slow down the processes. As such, many systems may prioritize keeping processes operational and may avoid defragmentation operations unless no other option may be available.

Security Improvements

The memory allocator may improve the security of a processing system when the memory allocator "zeros out" all of the memory when a block may be assigned to a process. One of the inherent features of the memory system described herein is that a process cannot access other memory outside of the block or blocks that were allocated.

The memory allocation and memory management may be operating system-level processes that may not be accessed by general processes running on the system. The security strength of the memory system may reflect the barrier between general processes and an operating system layer. When the barrier is strong, general-purpose processes may not be able to access memory locations that are not assigned to it. One version may be envisioned where multiple tenants of a GPU may enjoy memory that may be secure from other tenants.

The memory allocator may "zero-out" or erase all memory in each block it assigns. With such a function, a process may be assigned a memory block that may have been used by a previous process, but the new process may not be able to access any remnants or artifacts of a previous process. Such a function, in addition to the operating system-level security, may increase the memory security of processes that terminate or otherwise de-allocate a block of memory.

Improvement to Computer Systems

The memory allocator described herein fundamentally changes the function, performance, and usefulness of a conventional computer system. When the machine learning system operates on a conventional computer, that computer may be transformed into a device that underwrites loans much faster than conventional underwriting and with a much higher accuracy.

In some cases, portions of the machine learning system may be performed on specialized computer systems. Such systems may have specialized circuitry adapted for machine learning applications, such as hardware for running models of multi-level neural networks for example. Other systems may be specialized for training such neural network models.

Even when the machine learning system operates on a conventional computer system, that conventional computer system is given capabilities that have never been present in a conventional computer system. Such capabilities include the ability to approve or deny loans automatically or with human oversight, and the capability of analyzing a history of baskets of goods uncorrelated to a purchasing merchant to determine creditworthiness.

FIG. 1 is a diagram illustration of a memory addressing mechanism 100 for low-latency memory access. The mechanism 100 may use a fixed number of memory address bits 102. The fixed number of memory address bits 102 may address the full range of memory.

A block address prefix 104 may be the leading portion of the memory address bits 102, and the location address bits 106 may be trailing portion. The location address bits 106 may be the individual address space available to a process, and the block address prefix 104 may be the block address allocated to the process.

The block address prefix 104 may be assigned at an operating system level, such that the process may not have access to the block address prefix 104. Additionally, the operating system may overwrite any memory address by the process by prepending and overwriting the first set of address bits using the block address prefix 104. Because the overwriting may occur at the operating system level, every memory access by a process or application will inherently and automatically be limited to only the memory specifically allocated for that process.

In this example, the block address bits may be shown as a prefix with the location address bits as the suffix. However, other memory allocation and management systems may use different sets of bits within the memory address bits 102 for the block address and location address. In such systems, certain bits may be allocated as addressable space within the allocated block and other bits may be allocated as block address bits that may be combined to yield an addressable space within the memory.

The memory address bits 102 may, in many cases, be a complete address for a physical memory location. Such systems may be appropriate for GPU memory and other very high speed applications. Other systems may use the addressing mechanism 100 but may generate a virtual or other abstracted memory address. Such systems may use an abstracted layer between the addressable memory and the physical memory. In such systems, the addressing mechanism 100 may provide security by eliminating a process's ability to access memory outside of the allocated block, but the virtual addressing mechanism may provide a larger addressable memory than may be physically present.

Figure 2:
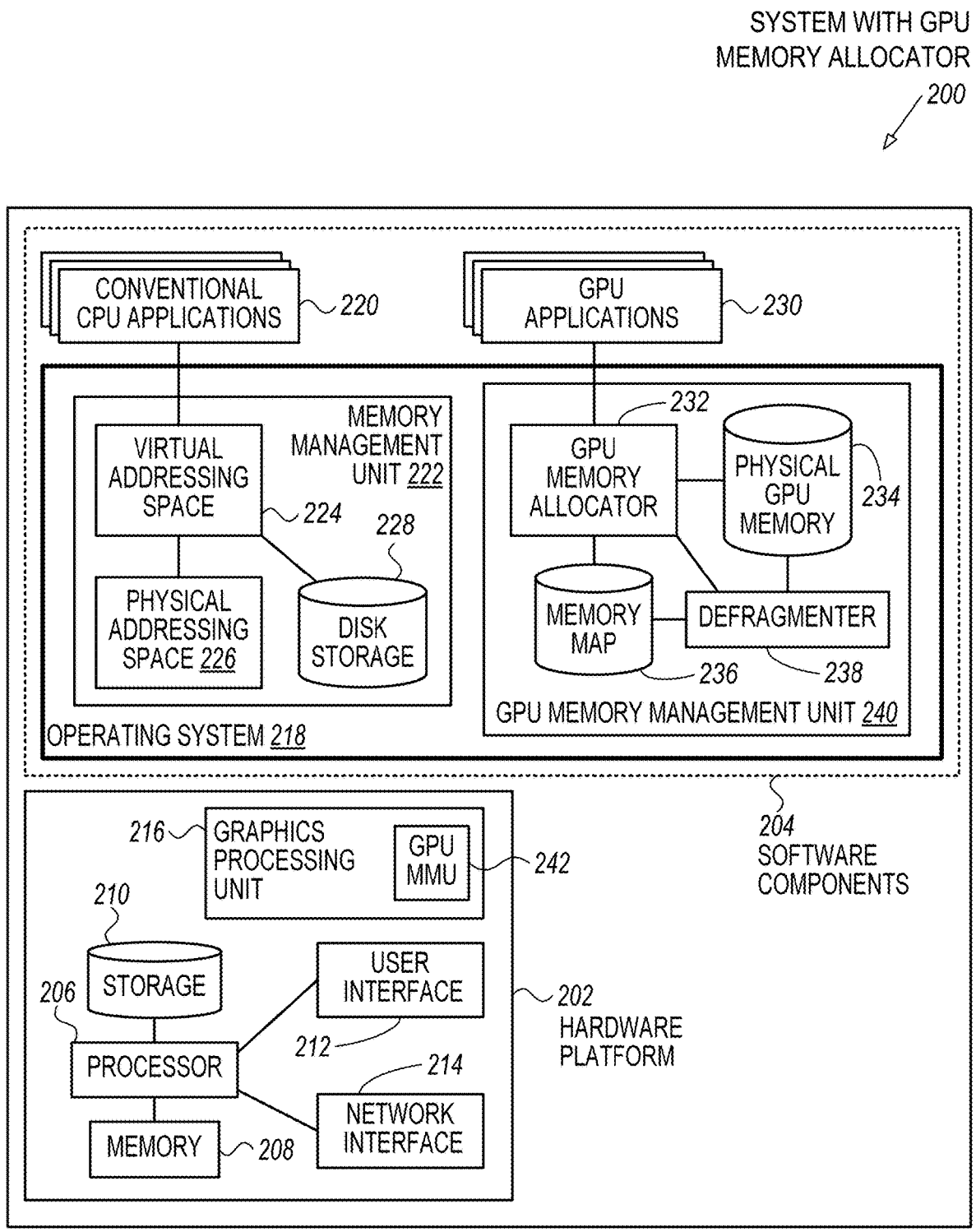
FIG. 2 is a diagram illustration of a system with a Graphical Processing Unit and a GPU memory manager.

FIG. 2 is a diagram of a system 200 showing components that may perform underwriting for loans using a basket of goods as the sole or primary factor for determining creditworthiness.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

System 200 may have a hardware platform 202 and various software components 204. The system 200 as illustrated represents a conventional computing device, although other embodiments may have different configurations, architectures, or components.

In many embodiments, the system 200 may be a server computer. In some embodiments, the system 200 may still also be a desktop computer, laptop computer, netbook computer, tablet or slate computer, wireless handset, cellular telephone, game console or any other type of computing device. In some embodiments, the system 200 may be implemented on a cluster of computing devices, which may be a group of physical or virtual machines.

The hardware platform 202 may include a processor 206, random access memory 208, and nonvolatile storage 210. The hardware platform 202 may also include a user interface 212 and network interface 214.

The random access memory 208 may be storage that contains data objects and executable code that can be quickly accessed by the processors 206. In many embodiments, the random access memory 208 may have a high-speed bus connecting the memory 208 to the processors 206.

The nonvolatile storage 210 may be storage that may persist after the system 200 may be shut down. The nonvolatile storage 210 may be any type of storage device, including hard disk, solid state memory devices, magnetic tape, optical storage, or other type of storage. The nonvolatile storage 210 may be read only or read/write capable. In some embodiments, the nonvolatile storage 210 may be cloud based, network storage, or other storage that may be accessed over a network connection.

The user interface 212 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 214 may be any type of connection to another computer. In many embodiments, the network interface 214 may be a wired Ethernet connection. Other embodiments may include wired or wireless connections over various communication protocols.

A graphics processing unit 216 may be a set of specialized processors configured for highly parallel applications. Many graphics processing units may have hundreds and even thousands of processors, and most such units have specialized memory dedicated to the GPU processors.

The software components 204 may include an operating system 218 on which various software components and services may operate.

The operating system 218 may contain many functions that may enable various applications to execute. In the example, a set of conventional computer processing unit (CPU) applications may execute, as well a GPU applications 230. The GPU applications may be highly parallel applications, such as graphics processing, machine learning applications, artificial intelligence applications, or other specialized applications designed for the GPU hardware. In many cases, a program may be launched as a conventional CPU application that executes on the processor 206, and the program may have routines or portions that may execute as a GPU application.

A conventional memory management unit 222 may be a component of a conventional operating system. A memory management unit 222 may have a virtual addressing space 224 which may direct read and write requests to a physical addressing space 226. The memory management unit 222 may allow a much larger memory addressing space than the available physical addressing space 226, and the memory management unit 222 may transfer or 'page' some memory to disk storage 228. When a memory request may be made for an addressing space that has been moved to the disk storage 228, that memory block may be transferred back to the physical addressing space 226 for access.

Conventional memory management unit 222 may allow a program to address a very large addressable memory, even though the physical memory is not as large as a program may request. While the paging in and out of memory may cause some applications to operate slower, a benefit may be that physical memory space may not be a restriction.

Conventional memory management unit 222 may have a benefit that all the physical memory may be utilized. Because the virtual addressing space 224 may map memory locations to any physical memory location, such memory management techniques may not have a restriction on contiguous physical memory blocks. Consequently, virtualized memory addressing often utilizes physical memory very well.

Each memory access using a conventional memory management unit 222 may involve several steps. A memory access request may be received using the virtualized address, then that address may be resolved using a lookup table to the physical memory address. If that address has been paged to disk, the page may then be retrieved from disk to be available for a program to access. Such a process trades off the flexibility of very large addressable memory for the slowness and processing overhead of the steps of accessing memory. For most conventional computer programs, a conventional memory management unit 222 provides an acceptable tradeoff.

GPU applications 230 may address memory using a different mechanism, that of a GPU memory management unit 240. The GPU memory management unit 240 may allocated physical GPU memory 234 for each GPU application 230 and allow for rapid access to physical memory directly, without using a virtual addressing space and by avoiding much of the overhead of a conventional memory management unit 222.

A GPU memory allocator 232 may be a routine that may receive a request for a memory block of a specific size, may identify which block in available GPU memory may be available, and may assign that block to a specific process. In so doing, the GPU memory allocator may assign a block address that may be prepended or overwritten on top of all memory addresses for that process. By prepending or overwriting the memory addresses using a predefined block address, the operating system 218 may prevent any GPU application 230 from accessing the GPU memory of another GPU application. Thus, the GPU memory management system may enforce memory security when multiple GPU applications 230 may run at the same time.

The GPU memory allocator 232 may maintain a memory map 236, which may contain the addressing space of the physical GPU memory 234 and the blocks of physical GPU memory 234 that have been allocated. As GPU applications 230 are setup and torn down, physical GPU memory 234 may be allocated and released. Over time, as different blocks may be allocated and released, the physical GPU memory 234 may become fragmented. A defragmenter 238 may periodically consolidate the unused blocks in the memory map 236 by pausing various GPU applications 230, copying the memory contents to a new location, and updating the allocated block address.

The GPU memory management unit 240 may be illustrated as an operating system 218 function, which may be implemented in software. In some designs, all or part of the GPU memory management unit 240 may be implemented in hardware, illustrated as the GPU memory management unit 242.

Figure 3:
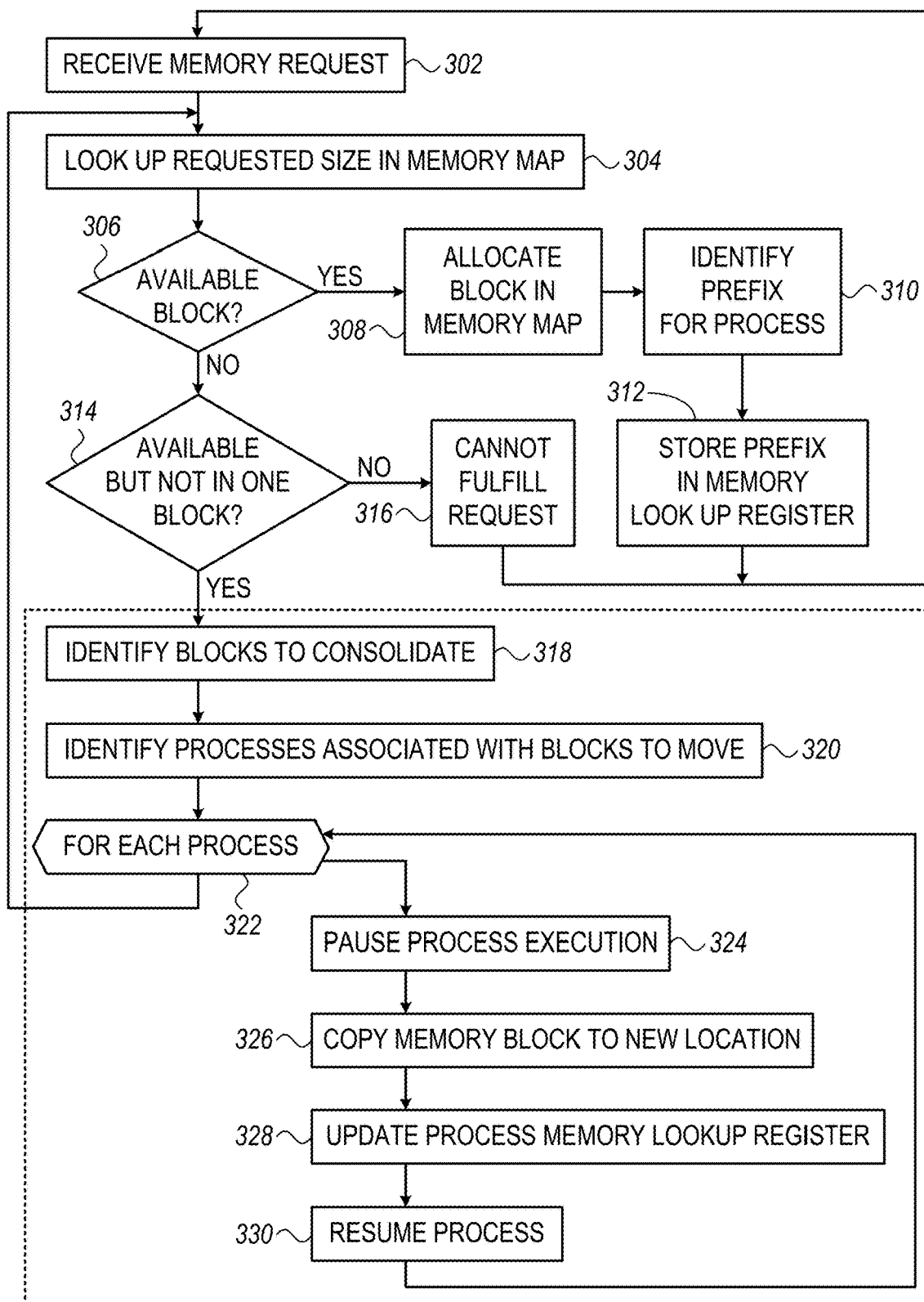
FIG. 3 is a flowchart illustration of a method for managing the allocation and defragmentation of GPU memory.

FIG. 3 is a flowchart illustration of a method 300 showing a sequence of memory management for GPU memory. Embodiment 300 shows a sequence of allocating memory to a process, including configuring a process to use the memory block, as well as defragmenting the memory. The memory management of method 300 may be an operating system-level operation, such that a conventional program or other process may not have access to the operating system functions.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A memory request may be received in block 302. The memory request may include a block size to be allocated for a specific process. The blocks may be sized using a power of 2 sizing scheme, such that the physical memory address may have a prefix that overwrites a certain number of registers for an address, leaving a power of 2 number of available address locations for the process.

The memory size may be looked up in the memory map in block 304 to determine whether an existing block of the requested size may be available. If the block may be available in block 306, the block may be allocated to the process in block 308. A prefix for the block may be determined in block 310, where the prefix may be the higher-level block address. The prefix maybe stored in a look up register for all memory access for the process in block 312. The prefix may provide the higher-level block address within memory, and the lower-level addresses may be the memory allocated to the process. The prefix may overwrite any memory request, such that the process may only access the memory allocated to it.

If the requested memory block may be larger than the available free memory in block 314, the request may be denied in block 316 because there may not be enough memory for the process.

If there is enough memory but the memory may not be available in a contiguous section in block 314, a memory defragmentation process 332 may be performed.

Memory blocks may be identified in block 318 that may be moved. The processes associated with those blocks may be identified in block 320. For each process in block 322, the process execution may be paused in block 324, and the memory block associated with the process may be moved to a new location in block 326. After successfully moving the memory contents to a new location, the memory lookup registers may be updated in block 328 and the process may resume in block 330. After defragmenting, the sequence may return to block 304 to attempt to allocate a block of memory in response to the request of block 302.

Figure 4:
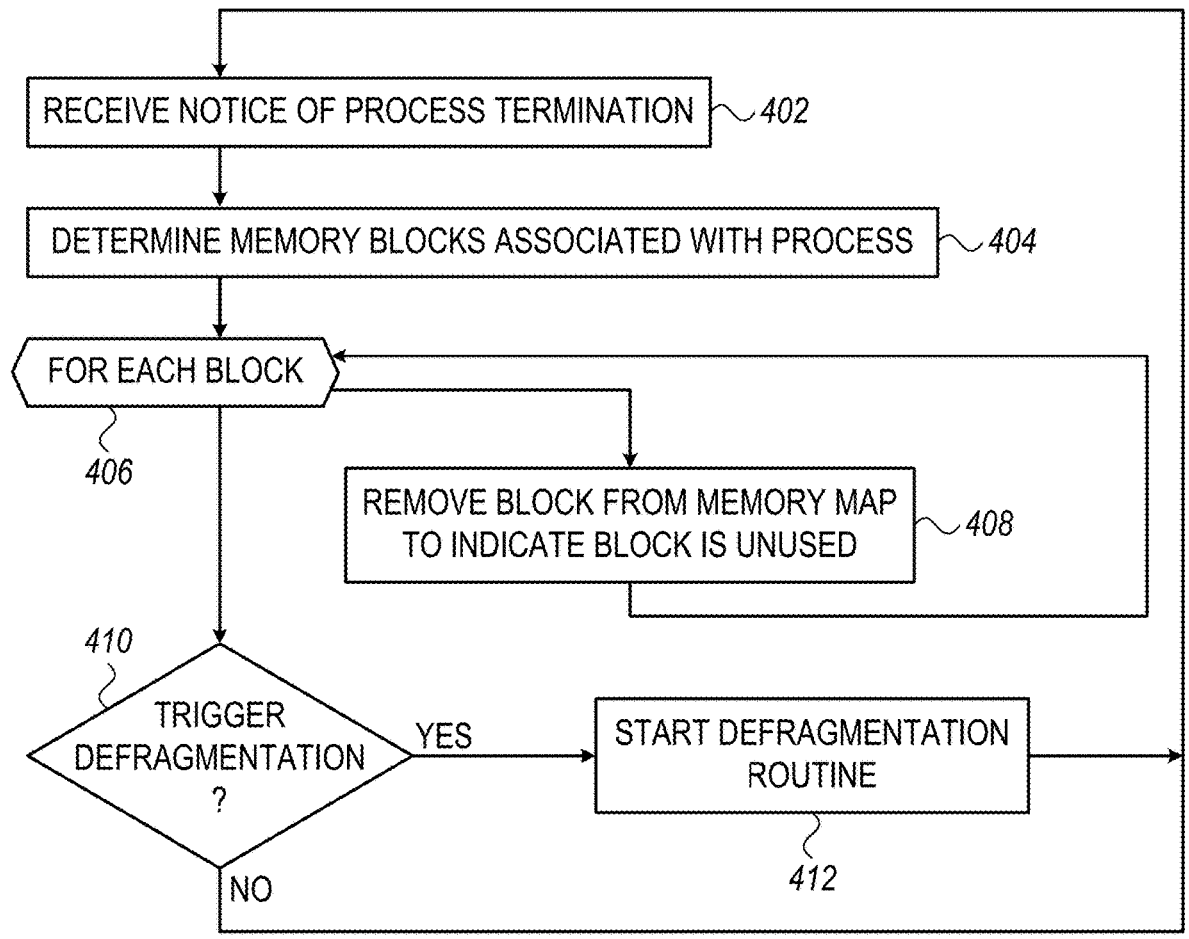
FIG. 4 is a flowchart illustration of a method for managing memory that may be deallocated.

FIG. 4 is a flowchart illustration of a method 400 showing a sequence of memory de-allocation. Embodiment 400 may illustrate one sequence by which memory may be deallocated and returned to the pool of available memory. Once in the pool of available memory, new or existing processes may request memory using the method 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A memory manager may receive notice in block 402 that a process may have terminated. The memory blocks associated with the terminated process may be identified in block 404. For each memory block associated with the terminated process in block 406, the block may be removed from the memory map, thereby freeing up the memory location in block 408. In some cases, a memory manager may also wipe the memory block clean so that a future process may not inadvertently encounter data left from a previous process.

As memory blocks may be freed, some systems may trigger a defragmentation routine in block 410. If defragmentation may be triggered in block 410, the defragmentation routine may be executed in block 412. An example of a defragmentation routine may be found in item 332.

Some systems may prophylactically perform defragmentation as memory blocks may be released. Such systems may maintain memory blocks of a specific size available for new processes. Other systems may trigger defragmentation when a block may be requested, and no contiguous block may be available. Still other systems may have different logic or algorithms to determine when and if a defragmentation process may be executed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A computer system having at least one assignable processor and processor-accessible memory, said system comprising:
   a memory allocator configured to perform a first method comprising:
      receiving a first memory request from a first process, said first memory request comprising a first memory block size, said first memory block size being a power of 2 number of addresses;
      identifying a first memory block within said processor-accessible memory being a contiguous block of at least said first memory block size;
      allocating said first memory block to said first process and assigning a first prefix address corresponding to a first address within said first memory block;
      storing said first prefix address for memory access by said first process; and
      acknowledging said allocating to said first process,
   a memory addressor configured to perform a second method comprising:
      receiving a first memory access request comprising a first memory address within said first memory block;
      prepending said first prefix address to said first memory address to form a first full memory location; and
      accessing said first memory block using said first full memory location.

2. The system of claim 1, said memory allocator further resetting said first memory block to a known state prior to said acknowledging.

3. The system of claim 2, said known state being all zeros.

4. The system of claim 1, said second method further comprising:
   receiving a second memory address request comprising a second memory address, said second memory address being an address greater than said first memory block size;
   prepending said first prefix address to said second memory address to create a second memory location such that said second memory address is converted into an address within said first memory block; and
   accessing said first memory block using said second memory address.

5. The system of claim 1:
   said second memory location being expressible as a first fixed number of bits:
   said first prefix address being expressible as a second number of bits; and
   said second memory address having at least one bit overwritten during said prepending said first prefix address to said second memory address.

6. The system of claim 1, said first method further comprising a memory moving process comprising:
   identifying a second location for said first memory block, said second location being within said processor-accessible memory;
   pausing said first process;
   copying contents of said first memory block to said second location for said first memory block;
   updating said first prefix address to a second prefix address corresponding to said second location; and
   resuming said first process using said second prefix address for memory accesses.

7. The system of claim 6, said method further comprising:
   receiving a second memory request from a second process, said second memory request comprising a second memory block size, said second memory block size being a base 2 number of addresses;

determining that a contiguous block size equal to or larger than said second memory block size is not available;

determining that moving said first memory block to a second location would open a larger contiguous block size; and causing said memory moving process to be performed.

8. The system of claim 1, said first prefix address being stored in a first set of hardware registers.

9. The system of claim 1, said first method further comprising:

receiving a second memory request from a second process for a first shared memory block, said second memory request comprising a second memory block size and an identifier for a third process;

identifying a second memory block within said processor-accessible memory being a contiguous block of at least said second memory size;

allocating said second memory block to said second process and to said third process, and assigning a second prefix address corresponding to said second memory block to an initial address within said second memory block;

storing said second prefix address for memory access by said second process and said third process; and acknowledging said allocating to said second process.

10. The system of claim 1, said at least one assignable processor being a Graphics Processing Unit (GPU).

11. The system of claim 1, said at least one assignable processor being a Central Processing Unit (CPU).

12. The system of claim 1, said at least one assignable processor being a specialized processing unit.

13. A computer operating system being operable on a hardware platform comprising at least one Central Processing Unit (CPU) and at least a first assignable processing unit and memory accessible to said first assignable processing unit, said operating system comprising:

a memory allocator configured to perform a first method comprising:

receiving a first memory request from a first process, said first memory request comprising a first memory block size, said first memory block size being a power of 2 number of addresses, said first process being assigned to be executed by said first assignable processing unit;

identifying a first memory block within said memory assignable to said first assignable processing unit being a contiguous block of at least said first memory block size;

allocating said first memory block to said first process and assigning a first prefix address corresponding to a first address within said first memory block;

storing said first prefix address for memory access by said first process; and acknowledging said allocating to said first process, a memory addressor configured to perform a second method comprising:

receiving a first memory access request comprising a first memory address within said first memory block;

prepending said first prefix address to said first memory address to form a first full memory location; and accessing said first memory block using said first full memory location.

14. The computer operating system of claim 13, said second method further comprising:

receiving a second memory address request comprising a second memory address, said second memory address being an address greater than said first memory block size;

prepending said first prefix address to said second memory address to create a second memory location such that said second memory address is converted into an address within said first memory block; and accessing said first memory block using said second memory address.

15. The computer operating system of claim 14:

said second memory location being expressible as a first fixed number of bits:

said first prefix address being expressible as a second number of bits; and said second memory address having at least one bit overwritten during said prepending said first prefix address to said second memory address.

16. The computer operating system of claim 13, said first method further comprising a memory moving process comprising:

identifying a second location for said first memory block, said second location being within said memory assignable to said first assignable processing unit;

pausing said first process;

copying contents of said first memory block to said second location;

updating said first prefix address to a second prefix address corresponding to said second location; and A resuming said first process using said second prefix address for memory accesses.

17. A method performed by a system comprising a processor, an assignable processor, and memory accessible to said assignable processor, said method comprising:

allocating memory by a first method comprising:

receiving a first memory request from a first process, said first memory request comprising a first memory block size, said first memory block size being a power of 2 number of addresses, said first process being assigned to execute on said assignable processor;

identifying a first memory block within said memory accessible to said assignable processor being a contiguous block of at least said first memory block size;

allocating said first memory block to said first process and assigning a first prefix address corresponding to a first address within said first memory block;

storing said first prefix address for memory access by said first process; and acknowledging said allocating to said first process;

addressing memory by a second method comprising:

receiving a first memory access request comprising a first memory address within said first memory block;

prepending said first prefix address to said first memory address to form a first full memory location; and accessing said first memory block using said first full memory location.

18. The method of claim 17, said first method further comprising resetting said first memory block to a known state prior to said acknowledging.

* * * * *